No. 734,800. PATENTED JULY 28, 1903.
R. C. & L. BEAUCHAMP.
CORN HARVESTER.
APPLICATION FILED APR. 9, 1903.
NO MODEL. 2 SHEETS—SHEET 1.
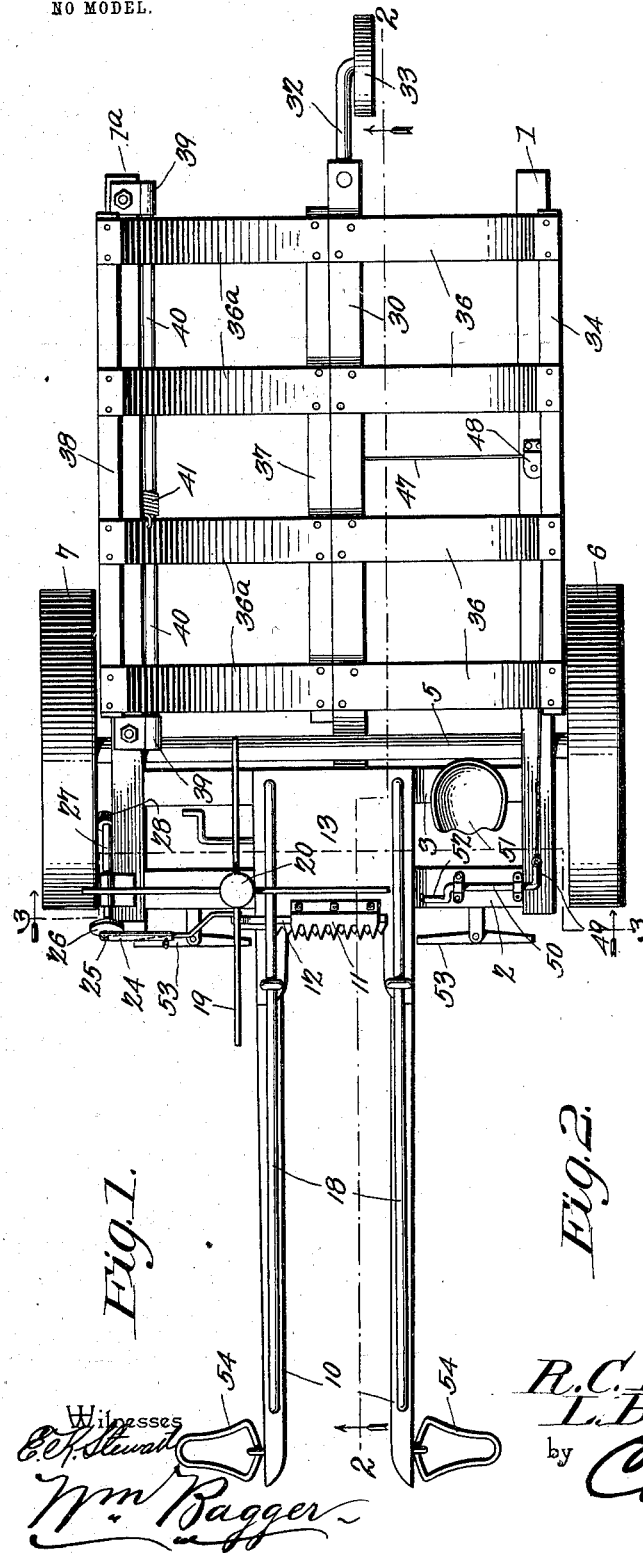
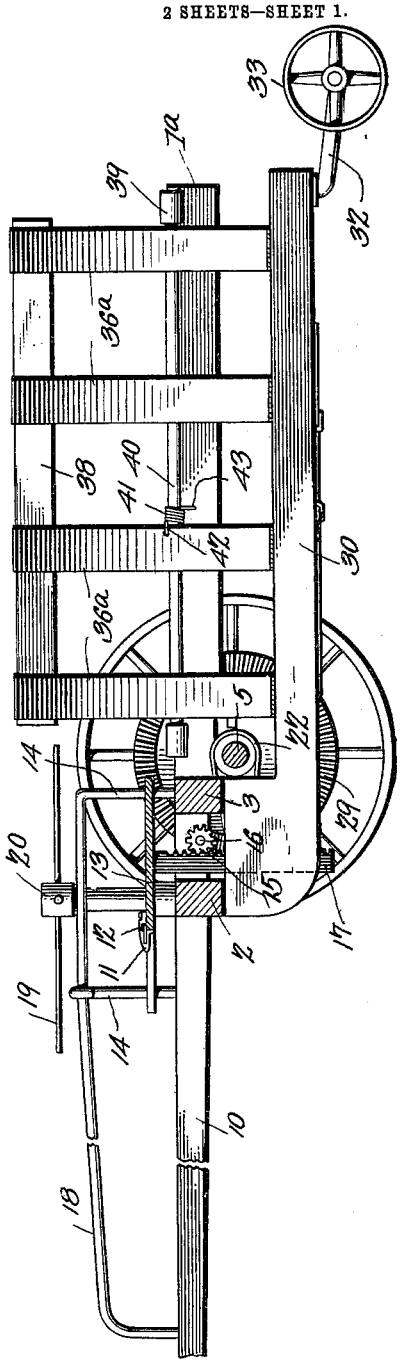
Fig. 1.
Fig. 2.
R. C. Beauchamp and
L. Beauchamp, Inventors

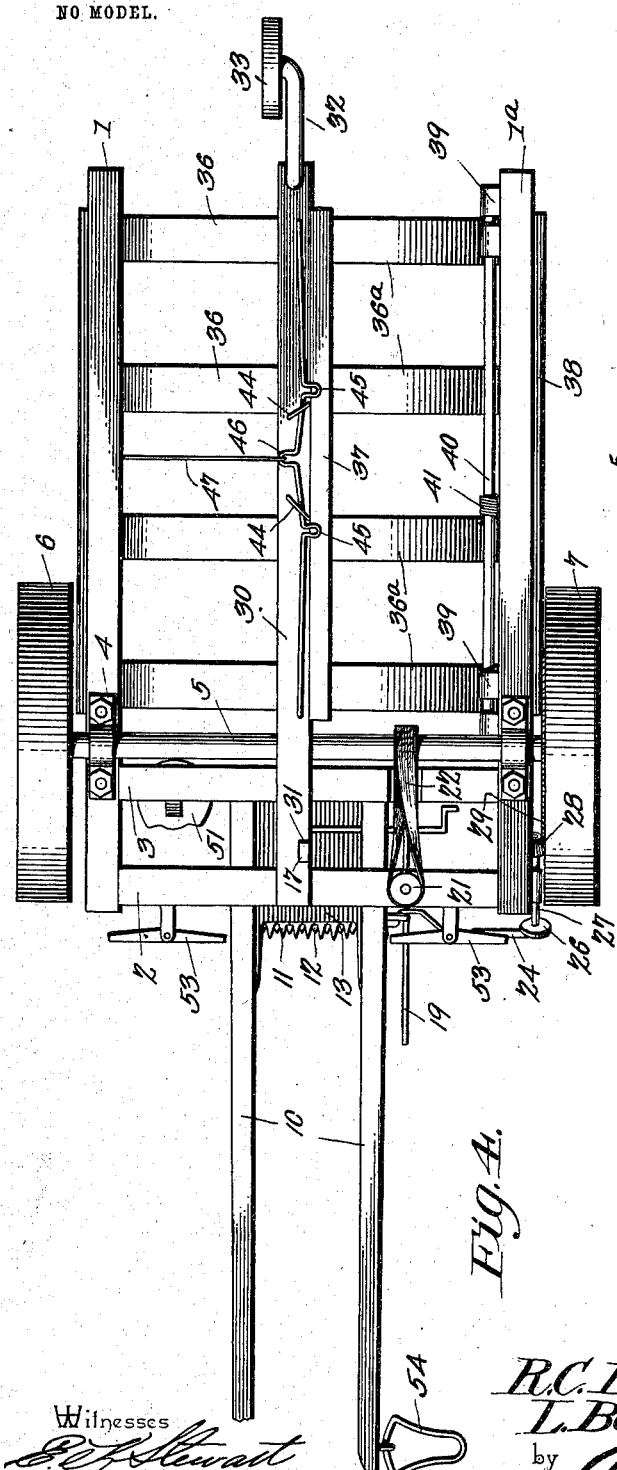

No. 734,800. Patented July 28, 1903.

UNITED STATES PATENT OFFICE.

ROBERT C. BEAUCHAMP AND LAFAYETTE BEAUCHAMP, OF FALLS OF ROUGH, KENTUCKY.

CORN-HARVESTER.

SPECIFICATION forming part of Letters Patent No. 734,800, dated July 28, 1903.

Application filed April 9, 1903. Serial No. 151,900. (No model.)

*To all whom it may concern:*

Be it known that we, ROBERT C. BEAUCHAMP and LAFAYETTE BEAUCHAMP, citizens of the United States, residing at Falls of Rough, in the county of Grayson and State of Kentucky, have invented a new and useful Corn-Harvester, of which the following is a specification.

This invention relates to corn-harvesters of that class which cut or sever the stalks, receive the cut stalks in a receptacle, and when a sufficient quantity has accumulated in the receptacle dump or deposit them upon the ground.

Our invention has for its object to provide a corn-harvester of this class which shall possess superior advantages in point of simplicity, durability, and general efficiency; and with these ends in view the invention consists in the improved construction, arrangement, and combination of parts, which shall be hereinafter fully described, and particularly pointed out in the claims.

In the accompanying drawings, Figure 1 is a top plan view of a corn-harvester constructed in accordance with the principles of our invention. Fig. 2 is a longitudinal sectional view of the same, taken on the line 2 2 in Fig. 1. Fig. 3 is a transverse sectional view taken on the line 3 3 in Fig. 1. Fig. 4 is a bottom plan view. Fig. 5 is a detail sectional view on the line 5 5 in Fig. 3 to show the wheel 6 and related parts.

Corresponding parts in the several figures are indicated by similar numerals of reference.

The frame of our improved machine comprises a pair of side bars 1 1$^a$, connected near their front ends by cross-braces 2 and 3. Said side bars are provided with depending boxes 4, forming bearings for the axle 5, which is mounted rotatably in said boxes and which carries the wheels 6 and 7, the former of which is mounted loosely upon said axle, but is provided with a spring-actuated pawl 8, which engages a ratchet-wheel 9, fixedly mounted upon the axle, so that when the machine is propelled in a forward direction rotary motion shall be imparted to the axle, while the machine may be backed without causing the axle to rotate.

10 10 designate a pair of tongue-bars which extend forwardly from the cross-bars 2 and 3, which are connected thereby, and these tongue-bars also serve as guide-bars for the corn which entering between said bars is guided to the cutting apparatus which is disposed between said bars at the rear ends of the latter. The cutting apparatus, which comprises an ordinary finger-bar 11 and a sickle or cutter-bar 12, is preferably supported upon a platform 13, which is vertically adjustable, so that the corn may be cut at various distances above the ground. In the accompanying drawings we have shown the said platform as being mounted slidably upon four supports or uprights 14, means for adjustment being provided in the shape of a pinion 15 upon a crank-shaft 16 and engaging a rack-bar 17, depending from the under side of the platform carrying the cutting apparatus. We desire it, however, to be understood that any other suitable means within the scope of our invention may be employed for effecting the vertical adjustment of the cutting apparatus.

The forwardly-extending guide-bars 10 are provided with guard-rails 18, which may consist of iron rods having downturned front and rear ends connected, respectively, with the front ends of the guide-bars 10 and with the cross bar or brace 3. Said downturned rear ends may be utilized to form two of the upright guides 14, the additional guides being mounted in the cross-bar 2 and connected at their upper ends with the rails 18. These rails serve to assist in guiding the corn to the cutting apparatus and to the reel 19, which consists of cross-bars extending horizontally through a shaft 20, mounted vertically in the cross-brace 2 and provided at its lower end with a pulley 21, which is connected by a band 22 with a pulley upon the axle 5, from which motion is thus imparted to the said reel.

The cutting apparatus is driven by a pitman 24, composed of two suitably-connected telescoping sections, connecting the cutter-bar with the wrist-pin 25 of a disk 26, mounted upon a shaft 27, having at its rear end a pinion 28, meshing with a bevel-gear 29 upon the wheel 7.

Firmly secured to the under sides of the cross-braces 2 and 3 is a rearwardly-extending beam 30, the front end of which may be recessed in one side thereof, as shown at 31, for the purpose of guiding the rack-bar 17, engaging the pinion 15. Said beam 30, as will be seen in the drawings, is curved or extended upwardly at its front end, so as to locate the body of said beam in a lower plane than would otherwise be the case. The rear end of the beam 30 supports a swiveled draw-bar 32, carrying a trail-wheel 33.

One of the side pieces 1 of the frame supports a longitudinal rail 34, which is connected therewith by means of braces 35, said rail being connected with the beam 30 by means of suitably-spaced curved slats 36, which coöperate to form one side of a cradle for supporting the corn after it has been cut. The other side of the cradle is formed of a plurality of curved slats 36$^a$, connecting a lower and an upper rail 37 and 38 and provided with bearings 39, whereby they are mounted upon a shaft 40, which is suitably secured in a position parallel to the side piece 1$^a$ of the frame. It will thus be seen that the part of the cradle composed of the straps 36$^a$ and the rails 37 and 38 is capable of swinging or tilting upon the shaft 40 for the purpose of depositing the corn accumulated in the cradle upon the ground. A spring 41, coiled upon the shaft 40, is provided with two projecting ends 42 and 43, one of which bears against the under side of one of the straps 36$^a$ and the other against the upper side of the frame-piece 1$^a$, thereby tending to maintain the lower part of the swinging cradle-section normally in a raised position and in contact with the adjacent side of the beam 30. Upon the under side of the latter is provided a latching device comprising a rod 43, of spring-steel, the ends of which are securely attached to the under side of said beam, with which it is additionally connected by intermediately-disposed keepers 44. Said steel rod is provided with loops 45, that extend outwardly beyond the edge of the beam 30 and serving to support the rail 37 of the swinging cradle member. The rod 43 is also provided with an oppositely-extending loop 46, which is connected by a cord or flexible member 47, passing over a suitably-disposed guide-pulley 48, with the crank 49 of a rock-shaft 50 suitably disposed in front of the driver's seat 51 and having a treadle 52, by pressure upon which the supporting latches or loops 45 may be withdrawn from under the rail 37 of the swinging cradle member, thus causing the latter to tilt under the weight of the corn contained in the cradle, so as to deposit the corn upon the ground, after which the action of the spring 41 will restore the swinging cradle-section to engagement with the loops or latches 45, whereby it is supported until another load has accumulated.

Whiffletrees 53 for the attachment of the draft are suitably connected with the front side of the front cross-brace 2, and links 54, likewise for the attachment of the draft-animals, are provided at the forward ends of the tongue-bars 10.

From the foregoing description, taken in connection with the drawings hereto annexed, the operation and advantages of our invention will be readily understood. When the machine progresses over the field, the row of corn will be guided between the tongue-bars of guide-bars 10 to the cutting apparatus, where the stalks are severed and caused by the reel to be tilted rearwardly into the cradle. When a load has been accumulated, the driver by simply pressing upon the treadle 52 may release the swinging section of the treadle, thus causing the load to be deposited upon the ground, the spring 41 serving to instantly restore the swinging cradle-section to its normal position.

We desire it to be understood that while we have in the foregoing shown and described a simple and preferred form of our invention we do not limit ourselves to the structural details herein set forth, but reserve the right to any changes, alterations, or modifications within the scope of our invention which may be resorted to without departing from the spirit or sacrificing the utility of the same.

Having thus described our invention, we claim—

1. In a corn-harvester, a frame comprising side pieces, a pair of cross-pieces connecting said side pieces near their front ends and forwardly-extending guide-bars, cutting apparatus disposed at the rear ends of said guide-bars, and guard-rails having depending ends connected, respectively with the front ends of the guide-bars and with the rear connecting-bar of the main frame.

2. In a corn-harvester, a frame having side pieces, and cross-pieces connecting said side pieces near their front ends, a rearwardly-extending beam secured to the under sides of said cross-braces, a rail, brackets connecting said rail with one of the side pieces of the frame, curved straps connecting said rail with the rearwardly-extending center beam, a swinging cradle-section having hinged connection with relation to the opposite side beam of the frame, and means for supporting said cradle-section normally in a raised position.

3. In a corn-harvester, the combination of a frame having side pieces connected by transverse braces, a beam extending rearwardly from the under side of said transverse braces, cutting apparatus supported upon the upper side of said cross-braces, and a cradle having a hinged section connected with one of the side beams of the frame and provided with spring means for retaining it normally in a raised position.

4. In a corn-harvester, a frame comprising side pieces and cross-pieces connecting the same near their front ends, guide-bars extending forwardly from said cross-pieces, guard-rails having downturned ends connected with the front ends of the guide-bars and with the rear cross-brace of the frame, braces connecting said guard-rails with the guide-bars, a platform vertically slidable upon the said braces and upon the downturned rear ends of the guard-rails, cutting apparatus supported on said platform, and means for effecting vertical adjustment of the latter.

5. In a corn-harvester, a frame comprising side pieces connected near their front ends by cross-bars, a beam secured to the under sides of and extending rearwardly from said cross-bars, guide-bars extending forwardly from, and connecting said cross-bars, guard-rails having downturned rear ends connected with the rear cross-bar and downturned front ends connected with the front ends of the guide-bars, braces connecting said guard-rails with the guide-bars, a platform vertically slidable upon said braces and upon the downturned rear ends of the guard-rails, cutting apparatus supported upon said platform, a rack-bar extending downwardly from the latter, a crank-shaft journaled in the guide-bars, a pinion upon said shaft engaging the rack-bar extending downwardly from the cutter-carrying platform, and means for conveying motion to the cutting apparatus from the source of power.

6. In a corn-harvester, a wheel-supported frame comprising side members and cross-bars connecting the same, a beam connected with the under sides of said cross-bars and extending rearwardly therefrom, a rail, curved slats connecting said beam with said rail and constituting a stationary cradle-section, a cradle-section connected hingedly with one of the side members of the frame and comprising upper and lower rails connected by curved slats, spring means for retaining said hinged cradle-section normally in a closed position, a latch-bar secured to the under side of the rearwardly-extending beam, having supporting-keepers and laterally-extending loops adapted to support the lower rail of the hinged cradle-section, and an oppositely-extending loop, a rock-shaft disposed in front of the driver's seat and having a treadle and a crank-arm, and a suitably-guided flexible connection between said crank-arm and the loop upon the latch-rod extending oppositely to the supporting-loops of the latter.

In testimony that we claim the foregoing as our own we have hereto affixed our signatures in the presence of two witnesses.

ROBERT C. BEAUCHAMP.
LAFAYETTE BEAUCHAMP.

Witnesses:
GEO. W. EVANS,
ROBT. S. GREEN.